United States Patent [19]

Rekers et al.

[11]  4,234,709
[45]  Nov. 18, 1980

[54] CATALYST COMPOSITION, METHOD FOR PRODUCING SAME AND METHOD FOR POLYMERIZATION OF 1-OLEFINS WITH SAME

[75] Inventors: Louis J. Rekers, Wyo.; Stanley J. Katzen, Cincinnati, Ohio

[73] Assignee: National Petro Chemicals Corporation, New York, N.Y.

[21] Appl. No.: 684,042

[22] Filed: May 7, 1976

Related U.S. Application Data

[60] Division of Ser. No. 532,131, Dec. 16, 1974, Pat. No. 3,985,676, which is a continuation-in-part of Ser. No. 436,263, Jan. 24, 1974, abandoned.

[51] Int. Cl.³ .............................. C08F 4/22; C08F 4/78
[52] U.S. Cl. .................................... 526/100; 526/129; 526/130; 526/134; 526/154; 526/156; 526/161; 526/172; 526/348.2; 526/352
[58] Field of Search ............... 526/129, 130, 134, 154, 526/156, 161, 172, 348, 349, 350, 351, 352, 100

[56]  References Cited

U.S. PATENT DOCUMENTS 3,474,080  10/1969  Rekers ................................ 526/172
3,704,287  11/1972  Johnson .............................. 526/129
3,984,351  10/1976  Rekers et al. ...................... 526/129
3,985,676  10/1976  Rekers et al. ...................... 526/172

Primary Examiner—Stanford M. Levin
Attorney, Agent, or Firm—Kenneth D. Tremain

[57]  ABSTRACT

Supported catalyst compositions incorporating preformed materials comprising the reaction product of organophosphorus compounds such as the organophosphates and organophosphites with chromium trioxide, wherein the organic moiety is a hydrocarbon radical, e.g., alkyl, aralkyl, aryl, cycloalkyl, or the like or combinations thereof. Typical supports constitute an inorganic material of high surface area, especially a high pore volume (>1.96 cc/g) silica xerogel. Catalytically promoted polymerizations of 1-olefins proceed efficiently to products of specially adapted utility for molding, and particularly the production of blow molded articles. The polymerization activity of the catalyst compositions is promoted by heating in a dry, oxygen containing atmosphere. The catalysts are utilized alone or in conjunction with other catalytic ingredients such as organometallic and/or organo non-metallic reducing agents.

13 Claims, No Drawings

CATALYST COMPOSITION, METHOD FOR PRODUCING SAME AND METHOD FOR POLYMERIZATION OF 1-OLEFINS WITH SAME

This is a division, of application Ser. No. 532,131, filed Dec. 16, 1974 (now U.S. Pat. No. 3,985,676), which is a continuation-in-part of Appln. Ser. No. 436,263, filed Jan. 24, 1974, abandoned.

BACKGROUND OF THE INVENTION

Molded articles, and particularly blow molded structures such as bottles are commonly formed from polymers of 1-olefins such as polyethylene. It is important to the commercial utilization of a given polymer system that the converted product such as a bottle exhibit an optimized balance of properties, including for example, acceptable stress crack resistance and flexural stiffness. In addition, and in a contributing sense, it is necessary that the polymer exhibit suitable processability i.e. satisfactory rheological behavior under flow and deformation during fabrication. Although the viscoelastic behavior of polymer melts has been the subject of considerable study, it has not proven possible to translate performance during fabrication to end use articles in such manner as to selectively determine polymerization and particularly catalyst requirements. Moreover, as in any case catalyst performance must also be measured in terms of efficiency or productivity and stability over a sensible life.

In the following description, supported catalytic systems for the production of polymers ideally suited to the fabrication of superior blow molded articles have been identified. In accordance with this invention, there are disclosed supported catalyst compositions incorporating preformed materials comprising the reaction product of organophosphorus compounds such as the organophosphates and organophosphites with chromium trioxide, wherein the organic moiety is a hydrocarbon radical, e.g., alkyl, aralkyl, aryl, cycloalkyl, or the like or combinations thereof. Typical supports constitute an inorganic material of high surface area, especially a high pore volume (>1.96 cc/g) silica xerogel. Catalytically promoted polymerizations of 1-olefins proceed efficiently to products of specially adapted utility for molding, and particularly the production of blow molded articles. The polymerization activity of the catalyst compositions is promoted by heating in a dry, oxygen containing atmosphere. The catalysts are utilized alone or in conjunction with other catalytic ingredients such as organometallic and/or organo non-metallic reducing agents.

In U.S. Pat. No. 3,474,080 issued Oct. 21, 1969 in the name of Louis J. Rekers and assigned to National Distillers and Chemical Corporation there were described compounds useful in the catalysis of 1-olefins which were prepared by the reaction of organophosphates and chromium trioxide.

Through further research it has now been found that such compounds lend themselves to the production of supported catalyst systems which are useful for the polymerization of 1-olefins, and the polymerization activity of which is strongly promoted by heating of the catalyst in a dry oxygen containing atmosphere. By an extension of this research it was also found that the resulting activated catalysts, used alone or in conjunction with certain reducing agents, produce polymers of 1-olefins and copolymers or interpolymers thereof having a very favorable blend of properties. The use of the organometallic and/or organic non-metallic reducing agents with the air/heat treated catalyst gives latitude in obtaining more variety in polymer property balance in addition to promoting catalytic activity.

In another U.S. Pat. No. 3,493,554 issued Feb. 3, 1970 in the name of Louis J. Rekers and assigned to National Distillers & Chemical Corp., there was disclosed the polymerization of 1-olefins in the presence of a reducing agent and a bis (diorgano) chromate compound as a catalyst.

Other researchers have also investigated certain other chromium compounds and phosphorous compounds and their use in olefin polymerization. For example, in their U.S. Pat. No. 2,825,721, issued on Mar. 26, 1956, Hogan et al described a polymerization process for olefins using as a catalyst chromium oxide and at least one material selected from the group consisting of silica, alumina, zirconia, and thoria, at least part of the chromium being in the hexavalent state at the initial contact of the hydrocarbon with the catalyst. In related U.S. Pat. No. 2,951,816 issued Sept. 6, 1960 Hogan et al described a method for preparing such catalysts by depositing chromium oxide on a support of the just recited group and heating at an elevated temperature under anhydrous conditions to impart increased catalytic activity.

In U.S. Pat. No. 2,945,015 issued July 12, 1960 in the name of Clyde V. Detter a process is described for polymerizing 1-olefins using a chromium oxide-phosphorous oxide supported catalyst, at least a portion of the chromium in the catalyst being in the hexavalent state. Supported chromium catalysts of limited productivity are disclosed in U.S. Pat. No. 3,349,067 as esters of chromyl chloride with e.g. tricresyl orthophosphate.

Other researchers have reported the use as catalysts for olefin polymerization of various silylchromate and polyalicyclic chromate esters. See, inter alia, U.S. Pat. Nos. 3,324,095 and 3,324,101, both issued on June 6, 1967; 3,642,749 issued Feb. 15, 1972; and 3,704,287, issued Nov. 28, 1972, all assigned to Union Carbide Corporation. The last of this group discloses placing the phosphorus chromate esters of U.S. Pat. No. 3,474,080 on a support and then reducing the catalyst prior to contact with the olefin by heating at elevated temperatures in the presence of an aluminum, magnesium or gallium organometallic compound.

The preparation and use of improved high pore volume silica xerogel materials suitable as catalyst supports is described in Belgium Pat. No. 741,437 and U.S. Pat. Nos. 3,652,214; 3,652,215 and 3,652,216, assigned to National Petro Chemicals Company, Inc.

Although such chromium catalysts, support media, and combined systems have been available for use in this art, and may in selected manner be employed to prepare polymers suitable for conversion into molded articles such as bottles, none are found to provide systems operable to afford the desirable features appurtenant the teaching of this invention.

SUMMARY OF THE INVENTION

This invention relates to the polymerization of 1-olefins, especially ethylene, to form either polyethylene or interpolymers of ethylene and other 1-olefins especially adapted for molding operations. The invention is based on the discovery that the reaction products produced by the reaction of organophosphorus compounds such as organo phosphites or organophosphates and chromium trioxide may be formed into catalytic systems for the production of polymers of 1-olefins of controlled characteristics, by adsorption on an insoluble, inorganic support of high surface area, generally subjected to treatment at elevated temperatures in a dry, oxygen containing atmosphere, such as dry air.

Additionally, we have discovered that the aforementioned catalyst system, usually as used in conjunction with certain organometallic and/or organo non-metallic reducing agents, e.g., triethyl aluminum, triisobutyl aluminum, triethyl boron, etc., permits the production of polymers of 1-olefins having a much broader variety of properties, especially with respect to MWD, i.e., molecular weight distribution (shear response), and thus complements and extends the utility of the original or basic catalyst system. Particularly advantageous catalyst systems are obtained when using as a support a silica xerogel of high pore volume, e.g., $>1.96$ cc/g.

The catalyst systems of this invention, when coupled with known polymerization processes, e.g., suspension, solution, vapor phase, etc. can produce polymers of a variety of molecular weights and molecular weight distributions which permit it to cover broadly the major applications of high and medium density polyethylene especially extrusion applications, e.g., blow molding, sheeting, film, etc.

The catalyst system is best defined by reference to the following description of the preparative method. For further information on the preparation of compounds of this type, reference may be had to the above mentioned U.S. Pat. No. 3,474,080 of L. J. Rekers.

In a typical general embodiment of this invention the organophosphorus compound and the chromium trioxide are brought together in a suitable inert solvent, e.g., cyclohexane, n-hexane, methylene chloride, carbon tetrachloride, etc. In this step in the preparation of the catalyst system, the solid $CrO_3$ is slurried in the solvent and the organophosphorus compound added. Over a period of time, e.g., about one hour, a reaction between the compounds ensues and the chromium trioxide disappears. During this period the solution becomes reddish-brown in color. It is ordinarily filtered simply to insure the absence of any unreacted solid $CrO_3$. This solution is then applied to the support in such manner as to effect the deposition of the catalyst solution thereon, suitably by any wet coating technique, e.g., spraying, on a support, e.g., silica, aluminum, etc. Typically, the solution is added to a dispersion of the preferred silica gel support. The preferred support is a high pore volume ($>1.96$ cc/g) silica xerogel. The solvent is removed from the base by drying, e.g., using heat, inert gas stripping, or reduced pressure alone or in combination. In this manner, the reaction product is placed on the support. It is considered significant that the organophosphoryl chromium reaction product is preformed i.e. the reacting entities are combined prior to the introduction to the support. The active catalyst is therefore understood not to derive from chromium trioxide but the organophosphoryl chromium reaction product as described.

The supported catalyst is then heated in a dry oxygen containing atmosphere, such as dry air, resulting in a marked promotion of polymerization activity. Heating is conducted at temperatures in the range of from about 400° to 2000° F., and preferably from about 1000° to 1790° F. The time period of the heating will vary depending on the temperature, but usually is conducted for from about at least 2 to 18 and preferably from about 6 to 12 hours.

The supported reaction product, after heat treatment, is then used alone or in conjunction with organometallic and/or organo non-metallic reducing agents, e.g., a trialkyl aluminum, dialkyl zinc, dialkyl magnesium, dialkyl aluminum chloride, dialkyl aluminum alkoxides, triethyl boron, etc., to polymerize 1-olefins. When used with such reducing agents, the catalyst systems provide a method for securing a desirable latitude of polymer properties, particularly molecular weight distribution, together with increased catalyst productivity.

In the following detailed description of the invention and operative Examples, a measure of the viscoelastic behavior of the polymer melt is expressed in values for melt index (M.I., determined in accordance with ASTM-D-1238, at 2 kg load and 190° C.) and high load melt index (HLMI, 10X) load and the shear sensitivity, (response of melt viscosity to the differential shear rates) is reflected in the HLMI/MI ratios. In general, the broader the molecular weight distribution, the more sensitive is the viscosity to shear rate i.e. the higher the HLMI/MI ratio. The lowest value for melt index that was measured at reasonable accuracy is about 0.1, but in many cases qualitative observation of a significantly lower rate is reported as 'low' herein, which may represent an actual value of as little as 0.05 or less. Performance testing indicates an HLMI/MI ratio consistent with other quantified results.

DETAILED DESCRIPTION OF THE INVENTION

Among the organic phosphorus compounds which may be used in the catalyst systems of this invention are the triorganophosphates and diorganophosphates including such compounds as triphenyl phosphate, tributyl phosphate, triethyl phosphate, trioctyl phosphate, trimethyl phosphate, etc. Also suitable are the mono(-dihydrogen) phosphate or phosphite and di(hydrogen) phosphate derivatives, (illustratively inclusive of monobutyl phosphate, dibutyl phosphate and monoethyl phosphite) and these materials may of course comprise mixtures. Organophosphoryl chromium reaction products are also formed with such phosphorus based compounds as phenyl phosphoric acid, diethyl ethyl phosphonate and trioctyl phosphine oxide. The preferred compounds are believed to have the following formula:

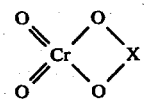

wherein X is $P-(OR)_3$ or $PH(OR)_2$ and wherein R includes alkyl, aralkyl, aryl, cycloalkyl, or hydrogen, but at least one R is other than hydrogen. The alkyl derivatives and particularly the trialkyl phosphates are especially preferred. Typical examples of the preparation of the catalyst systems follow.

CATALYST PREPARATION #1 a. 125 ml of dichloromethane were placed in a 3-neck 500 ml flask equipped with a nitrogen inlet for blanketing, a gas outlet tube, magnetic stirring means, and a 100 ml dropping funnel. Under a nitrogen cover, 9.70 gms $CrO_3$ (0.097 m) were added to the stirred flask containing the dichloromethane solvent. From the dropping funnel 17.5 gms triethyl phosphate (0.097 m) dissolved in 75 ml dichloromethane were added over a period of 20 minutes. Within five minutes of the beginning of the addition of the triethyl phosphate the solution in the flask turned dark reddish-brown in color. At the end of one hour of stirring all the $CrO_3$ had disappeared and the solution had become a dark reddish-brown color. Upon weighing, the solution was found to weigh 217.6 gms.

In order to place the compound on a support, 210 grams of microspheroidal silica gel (Davison MS 952) were placed in a 2000 ml round bottom flask, equipped with a stirrer and provided with a nitrogen blanket. Then 800 ml dichloromethane were added to the flask containing the gel and stirring was commenced in order to insure a uniform wetting of the gel. Then 90 grams of the dark reddish-brown color filtered solution were added to the flask containing the gel and dichloromethane solvent. After stirring for about 15 minutes, the stirrer was turned off and the gel was allowed to settle. At this time, it was observed that the gel had a brownish color and the dichloromethane solvent was almost colorless. This indicated that the catalyst compound was very strongly preferentially adsorbed on the gel. The supernatant liquid was removed by filtration and the gel was dried in a rotary evaporator at 55° C. and 29 inches Hg vacuum. The dried and catalyst coated gel containing 0.99% wt. chromium and 0.60% wt. phosphorus was then treated at elevated temperature, i.e., 1110° F. for 6 hours while simultaneously passing dry air through the catalyst.

b. Chromium dioxide was found not to react with triethyl phosphate under identical conditions where chromium trioxide does react.

CATALYST PREPARATION #2

250 ml of dichloromethane were placed in a 3-neck 500 ml flask equipped with a nitrogen inlet for blanketing, a gas outlet tube, magnetic stirring means, and a 100 ml dropping funnel. Under a nitrogen cover 2.9 gms $CrO_3$ (0.029 m) were added to the stirred flask containing the dichloromethane solvent. From the dropping funnel 5.6 gms dibutyl phosphite (0.029 m) dissolved in 25 ml dichloromethane were added over a period of 20 minutes. Within five minutes of the beginning of the addition of the dibutyl phosphite the solution in the flask turned dark reddish-brown in color. Stirring was continued for 2 hours and the $CrO_3$ disappeared and the solution became a dark reddish-brown color. Upon weighing, the solution was found to weigh 353 gms.

In order to place the compound on a support, 42 grams of Polypor Silica Gel (Pore Volume 2.5 cc/gm) were placed in a 2000 ml round bottom flask, equipped with a stirrer and provided with a nitrogen blanket. Then 100 grams of the reddish-brown filtrate (the solution was passed through a filter to insure the absence of unreacted $CrO_3$) were added to the flask containing the Polypor Silica Gel. After about 15 minutes, the gel had turned a brownish color and the dichloromethane solvent was almost colorless. This indicated that the catalyst compound was very strongly and preferentially adsorbed on the gel. The supernatant liquid was removed by filtration and the gel was dried in a rotary evaporator at 55° C. and 29 inches Hg vacuum. The dried and catalyst coated gel containing 1.02% wt. chromium and 0.60% wt. phosphorus was then treated at elevated temperature, i.e., 1650° F. for 6 hours while simultaneously passing dry air through the catalyst.

CATALYST PREPARATION #3

In a manner of preparation similar to that of Example 2 but utilizing 3.66 gms $CrO_3$ (0.0366 m) and 7.23 gm dibutyl phosphite (0.0373 m) in a total of 373 gms of dichloromethane as reaction media and solvent a solution of the dibutyl phosphite chromium trioxide compound was prepared. This solution was used to coat 195 gm of Polypor silica gel to a 0.97% wt. chromium and 0.6% wt. phosphorus. This coated Polypor silica gel after removal of the dichloromethane was then treated at 1650° F. for 6 hours while passing air through the sample.

The catalysts of the foregoing Examples are utilized in the polymerization of ethylene in the Polymerization Examples which follow, with and without various reducing agents such as triisobutyl aluminum and triethyl boron.

The amounts of organophosphoryl chromium compound deposited on the support may vary widely depending on the nature of the compound and the desired levels of chromium and phosphorous. Likewise the amount of reducing agents used in conjunction with the organophosphoryl catalyst may vary.

The most effective catalysts have been found to be those containing the organophosphoryl chromium compound in an amount such that the amount of Cr by weight on the support is from about 0.25 to 2.5% and preferably is from about 0.5 to 1.25%, although amounts outside the foregoing ranges still yield operable catalysts. The catalyst is commonly prepared at equimolar ratio, although an excess of the organophosphorus compound may be employed. Cr/P ratios calculated on an elemental weight basis in the supported catalyst are typically 1.0.6.

In proportioning the amount of reducing agent to the amount of organo phosphoryl chromium compound used as the catalyst, fairly wide latitude is available, but some guidelines have been established consistent with good yield, favorable polymer properties, and economic use of materials. For example, in the use of organometallic and organo non-metallic reducing agents with an amount of organophosphoryl chromium compound sufficient to yield about 1% Cr by weight of the support the parameters set forth below are representative. The atomic ratios are based upon a calculation of the metal in the organometallic reducing agent and the non-metal in the organo non-metallic reducing agent versus the chromium content present in the organophosphoryl chromium compound.

For example, based upon an amount of organophosphoryl chromium compound containing about 1% by weight of Cr based upon the weight of the support, the preferred amount of an organometallic reducing agent for use therewith, e.g., triisobutyl aluminum (TIBAL), is about 11.4% by weight giving an Al/Cr atomic ratio of about 3/1. The preferred range of atomic ratios of Al to Cr is from about 1/1 to about 5/1, or from about 3.8% to about 19% by weight TIBAL. The overall practicable limits of TIBAL in terms of the Al/Cr atomic ratio are from about 0.1/1 to 20/1, and in terms of weight are from about 0.4% to about 75% by weight.

Another example of an organometallic reducing agent for use in conjunction with the organophosphoryl chromium compound is triethyl aluminum. Again based upon an amount of organophosphoryl chromium compound containing about 1% by weight of Cr based upon the weight of the support, the preferred amount of triethyl aluminum (TEA) is about 6.6% by weight giving an Al/Cr atomic ratio of about 3/1. The preferred range of atomic ratios of Al to Cr is from about 1/1 to about 5/1, or from about 2.2% to about 11% by weight of TEA. The overall practicable limits of TEA, in terms of an Al/Cr ratio, are from about 0.1/1 to 20/1, and in terms of weight are from about 0.22% to about 44% by weight.

Triethyl boron (TEB) may be taken as the preferred example of the proportions of non-metallic reducing agent for use in conjunction with the organophosphoryl chromium compound. Again based upon an amount of organophosphoryl chromium compound containing about 1% by weight of Cr based upon the weight of the support, the preferred amount of TEB is about 5% by weight giving a B/Cr atomic ratio of about 2.7/1. The preferred range of atomic ratios of B to Cr is from about 0.1/1 to 10/1, or from about 0.19 to about 19% TEB. The overall practicable limits, in terms of a B/Cr ratio, are from about 0.01/1 to about 20/1, and in terms of weight, are from about 0.02% to about 38% by weight.

With respect to the supported catalyst comprising the organophosphoryl chromium compound deposited on the support the conditions of treatment at elevated temperatures may be varied. In general, the catalyst is heated in dry air or other dry oxygen containing gas at a temperature above about 400° F. and preferably over about 650° F. for a period of about 2 hours or more. Using the preferred high pore volume silica gel support described above, heating in the range of from about 1450° F. to about 1650° F. for up to about 6 hours is desirable. For other supports a regimen of heating at above about 400° F. and preferably above 1000° F. for about 6 hours is effective.

The dry air or other oxygen containing gas should preferably be dehumidified down to a few parts per million (ppm) of water to obtain maximum productivity from the catalyst. Typically the air used in the processes described in this application is dried to less than about 2-3 ppm of water.

As indicated above, the catalysts of this invention are amenable to use with conventional polymerization processes and are suitable for polymerization effected under temperature and pressure conditions generally employed in the art, e.g., temperature of from about 100° F. to about 400° F. and preferably from about 160° F. to 230° F., and pressures of from 200 to 1000 psig and preferably from 300 to 800 psig, as are used in slurry polymerizations.

The 'organophosphoryl chromium' reaction products which form the basis for the novel supported catalysts of this invention may be formed as seen in the above Examples from organophosphorus compounds in a reaction with chromium trioxide in an inert solvent, identifiable by the dissolution of the characteristic chromium trioxide. Suitable organophosphorus compounds may accordingly be readily selected for efficacy by reference to this test. It will be observed that the typical materials are derived from compounds containing at least one organic moiety directly bonded through carbon or oxygen to the phosphorus atom, in the +3 or +5 oxidation state and at least one valency is satisfied by oxygen or a hydroxyl grouping. Preferred compounds may be schematically referred to as structures of the type

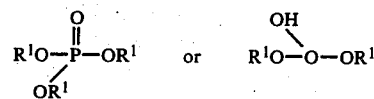

wherein $R^1$ is alkyl, aralkyl, aryl, cycloalkyl, or hydrogen, but at least one $R^1$ is other than hydrogen. However, for ease of description the operable materials are referred to in the specification and claims collectively and comprehensively as 'organophosphoryl chromium' reaction products.

The following Examples illustrate the use of the catalyst systems of the invention in methods for polymerization of alpha olefins such as ethylene.

POLYMERIZATION EXAMPLE 1

To a stirred autoclave there were added 0.9 kg of isobutane, ethylene to a pressure of 130 psig to give 10 mole % in the liquid phase, 0.33 gm hydrogen/kg solvent, 0.82 gms supported catalyst, i.e., triethyl phosphoryl chromium compound placed on Davison MS 952 gel to give 0.99% wt. chromium and 0.6% wt. phosphorus and then air/heat treated at 1110° F. for 6 hours, and triisobutyl aluminum sufficient to give a 1.4 to 1 atomic ratio of aluminum to chromium. The stirred autoclave with the above contents was heated to 200° F. At this time the total pressure was 435 psig. Polymerization began almost immediately as noted by the ethylene coming from the ethylene demand supply system to the reactor. After one hour of polymerization the reaction was terminated by dropping the reactor contents into the pressure let-down system. In all, 319 grams of polyethylene having a melt index (M.I.) of 0.21 and a high load melt index (HLMI) of 16 (HLMI/MI=76)(ASTM D-1238) before homogenizing were recovered. Based on the catalyst charge of 0.82 gms the yield was 390 gms polyethylene/gm cat/hour.

POLYMERIZATION EXAMPLE 2

To a stirred autoclave there were added 0.9 kg of isobutane, ethylene to a pressure of 130 psig to give 10 mole % in the liquid phase, 0.33 gm hydrogen/kg solvent, 1.59 gms supported catalyst of Example 1, and triethyl boron sufficient to give a 3.8 to 1 atomic ratio of boron to chromium. The stirred autoclave with the above contents was heated to 200° F. At this time the total pressure was 435 psig. Polymerization began almost immediately as noted by the ethylene coming from the ethylene demand supply system to the reactor. After one hour of polymerization the reaction was terminated by dropping the reactor contents into the pressure let-down system. In all, 439 grams of polyethylene having a melt index (M.I.) of 0.036 and a high load melt index (HLMI) of 10 (HLMI/MI=278) before homogenizing were recovered. Based on the catalyst charge of 1.59 gms the yield was 275 gms polyethylene/gm cat/hour.

POLYMERIZATION EXAMPLE 3

To a stirred autoclave there were added 0.9 kg of isobutane, ethylene to a pressure of 130 psig to give 10 mole % in the liquid phase, 0.33 gm hydrogen/kg solvent, and 2.08 gms supported catalyst of Example 1. The stirred autoclave with the above contents was heated to 200° F. At this time the total pressure was 435 psig. Following an induction period of about 30 minutes polymerization began as noted by the ethylene coming from the ethylene demand supply system to the reactor. After one hour of polymerization the reaction was terminated by dropping the reactor contents into the pressure let-down system. In all, 443 grams of polyethylene having a melt index (M.I.) of 0.05 and a high load melt index (HLMI) of 7.0 (HLMI/MI=140) before homogenizing were recovered. Based on the catalyst charge of 2.08 gms the yield was 212 gms polyethylene/gm cat/hour.

POLYMERIZATION EXAMPLE 4

To a stirred autoclave there were added 0.9 kg of isobutane, ethylene to a pressure of 130 psig to give 10 mole % in the liquid phase, 1.0 gm hydrogen/kg solvent, 0.46 gms of the supported catalyst preferred in Catalyst Preparation #2, i.e., dibutyl phosphoryl chromium compound placed on Polypor silica gel to give 1.02% wt. chromium and 0.6% wt. phosphorus and then heat treated at 1650° F. for 6 hours, and triisobutyl aluminum sufficient to give a 1.4 to 1 atomic ratio of aluminum to chromium. The stirred autoclave with the above contents was heated to 200° F. At this time the total pressure was 415 psig. Polymerization began almost immediately as noted by the ethylene coming from the ethylene demand supply system to the reactor. After one hour of polymerization the reaction was terminated by dropping the reactor contents into the pressure let-down system. In all, 298 grams of polyethylene having a melt index (M.I.) of 1.45 and a high load melt index (HLMI) of 75 (HLMI/MI=52) before homogenizing were recovered. Based on the catalyst charge of 0.46 gms the yield was 650 gms polyethylene/gm cat/hour.

POLYMERIZATION EXAMPLE 5

In a manner similar to that of Polymerization Example 4 but utilizing 0.60 gms of the catalyst from Catalyst Preparation #2 and without the triisobutyl aluminum a polymerization of ethylene was carried out at 220° F. and at a total pressure of 490 psig. Polymerization began immediately and after 1 hour the reaction was terminated and 510 gms of polyethylene having a melt index of 1.5 and an HLMI of 71 before homogenizing were recovered. Based on the catalyst charge of 0.60 gms the yield was 850 gms polyethylene/gm catalyst/hour.

POLYMERIZATION EXAMPLE 6

To a stirred autoclave there were added 0.9 kg of isobutane, ethylene to a pressure of 130 psig to give 10 mole % in the liquid phase, 0.57 gms of the supported catalyst of Catalyst Preparation #3, and triethyl boron sufficient to give a 2.7 to 1 atomic ratio of boron to chromium. The stirred autoclave with the above contents was heated to 200° F. At this time the total pressure was 435 psig. Polymerization began almost immediately as noted by the ethylene coming from the ethylene demand supply system to the reactor. After one hour of polymerization the reaction was terminated by dropping the reactor contents into the pressure let-down system. In all, 648 grams of polyethylene having a melt index (M.I.) of less than 0.1 and a high load melt index (HLMI) of 16.7 (ASTM D-1238) before homogenizing were recovered. Based on the catalyst charge of 0.57 gms the yield was 1137 gms polyethylene/gm cat/hour.

POLYMERIZATION EXAMPLE 7

To a stirred autoclave there were added 0.9 kg of isobutane, ethylene to a pressure of 130 psig to give 10 mole % in the liquid phase, and 0.53 gms supported catalyst of Catalyst Preparation #3 and sufficient triisobutyl aluminum to give an Al/Cr ratio of 1.5. The stirred autoclave with the above contents was heated to 200° F. At this time the total pressure was 390 psig. Following an induction period of about 30 minutes polymerization began as noted by the ethylene coming from the ethylene demand supply system to the reactor. After one hour of polymerization the reaction was terminated by dropping the reactor contents into the pressure let-down system. In all, 652 grams of polyethylene having a melt index (M.I.) of 0.07 and a high load melt index (HLMI) of 10.5 (ASTM D-1238) before homogenizing were recovered. Based on the catalyst charge of 0.53 gms the yield was 1230 gms polyethylene/gm cat/hour.

The use of various organo phosphoryl chromium compounds in supported, heat treated catalyst systems for the polymerization of 1-olefins is further illustrated in the data set forth in Table I.

TABLE I

| Various Organophosphoryl Chromium Compounds as Polymerization Catalysts | | | | | | | | |
|---|---|---|---|---|---|---|---|---|
| Organophosphoryl Chromium Compound (1) | Support (2) Treatment | % Cr/Base | Catalyst (6) Treatment | Al/Cr (4) | Productivity(5) gm Polymer/ gm Cat/hr. | MI | HLMI | HLMI/MI |
| triethyl phosphate | 1000° F./6 hrs. (2) | 1.0 | 1112° F./2 hrs. | 5/1 | 950 | 0.15 | 17.6 | 117 |
| trioctyl phosphate | neat (2) | 0.88 | 1112° F./6 hrs. | 2.6/1 | 735 | 0.07 | 10.0 | 143 |
| triphenyl phosphate | 1000° F./6 hrs. (2) | 1.0 | 1112° F./6 hrs. | 2.6/1 | 400 | 0.18 | 28.5 | 160 |
| dibutyl phosphite | neat (3) | 1.02 | 1650° F./6 hrs. | 2.70/1 | 1076 | 2.1 | 103.0 | 49 |
| diethyl phosphite | neat (3) | 1.05 | 1650° F./6 hrs. | 1.50/1 | 1313 | 0.70 | 49.6 | 71 |

(1) Reacted mole/mole $CrO_3$ to form the desired reaction product.
(2) Base $SiO_2$ is Davison MS 952. Treatment performed prior to coating the organophosphoryl chromium compound on the base.
(3) Base is Polypor silica gel with P.V. about 2.5 cc/gm. and surface area about $350 m^2/gm$.
(4) Al added as triisobutyl aluminum reducing agent.
(5) Polymerization temperature 200° F. Hydrogen concentration varied from 0.33 gm to 1.0 gm/kg solvent.
(6) Catalyst consists of the organophosphoryl chromium deposited on the support.

It is readily observable from the data shown in Table I that a variety of organo phosphorus/chromium trioxide reaction products are suitable for use in this invention, including those produced by the reaction of $CrO_3$ with phosphorus compounds having substitutions from alkyl through aryl.

Further illustration of the usage of this new catalyst is seen in Table II wherein polymerizations were conducted using triisobutyl aluminum as reducing agent, but the Al/Cr ratio was varied. In addition it is also seen from the data in Table II that better catalyst productivity is found at an intermediate triisobutyl aluminum concentration. Further the polymer flowability as indicated by the HLMI increases with increasing Al/Cr atomic ratios.

TABLE II
Effect of Triisobutyl Aluminum Concentration

| Al/Cr | Productivity (gm Polymer/ gm Catalyst/Hr) | MI | HLMI |
|---|---|---|---|
| Triethyl phosphoryl Chromium (1) | | | |
| 0.67 | 700 | Low | 4.8 |
| 1.33 | 1030 | Low | 5.8 |
| 2.63 | 342 | Low | 12.8 |
| 5.35 | 96 | 0.90 | 23.8 |
| Dibutyl phosphoryl Chromium (2) | | | |
| 1.35 | 644 | 1.45 | 75.9 |
| 2.70 | 1076 | 2.1 | 103 |

Polymerization Conditions

| | |
|---|---|
| Temperature | 200° F. |
| Solvent | isobutane |
| Ethylene | 10 mole % |
| Pressure (Total) | 420 psig |
| $H_2$ Concentration | 0.33 gm/kg solvent |

(1) Catalyst on POLYPOR silica gel (P.V. 2.3 cc/gm) air heat treated at 1110° F./6 hours. Catalyst contains approximately 1% chromium and 0.6% phosphorus.
(2) Catalyst on Polypor silica gel (P.V. 2.5 cc/gm) air heat treated at 1650° F./6hrs. Catalyst contains approximately 1% chromium and 0.6% phosphorus.

As still further indication of the versatility of this catalyst, Table III shows the effect of increased polymerization temperature upon the MI of the polymer produced with the new catalyst system. In addition, it is to be noted that the triethyl phosphoryl chromium compound has been prepared using excess phosphate compound, for example, in a molar ratio of 2/1 of phosphate to $CrO_3$ without any deleterious effects.

TABLE III
Triethyl Phosphoryl Chromium (1)
Effect of Polymerization Temperature

| Polymerization Temperature, °F. | Al/Cr(2) | Productivity gm Polymer/ gm Cat/Hour | MI |
|---|---|---|---|
| 190 | 3.2 | 520 | 0.04 |
| 220 | 2.8 | 411 | 0.19 |

Polymerization Conditions

| | |
|---|---|
| Solvent | isobutane |
| Ethylene | 10 mole % |
| Pressure (total) | 380 psig |
| $H_2$ Concentration | 0.33 gm/kg solvent |

(1) Catalyst is triethyl phosphoryl chromium on Davison MS 952 at 1.0% chromium and 1.2% phosphorus air/heat treated at 1110° F./6 hours.
(2) Aluminum as triisobutyl aluminum.

A still further extension of this catalyst system is the type of base which may be used as support for the catalyst. In Table IV it is readily seen that either $MgCO_3$ or $Al_2O_3$ as well as $SiO_2$ are suitable supports for the catalyst. The heat treatment was conducted in air on the catalyst after deposition of the triethyl phosphoryl chromium compound on the indicated support. The preferred base materials are of generally high surface area ranging from 100 to 1000 $m^2/g$ or more.

TABLE IV
Triethyl Phosphoryl Chromium on Various Supports

| Support | Air/Heat Treat Temperature °F./Hrs. | % Cr | % P | Al/Cr (1) Atomic Ratio | Productivity (g Polymer/ gm Catalyst/Hour) | Polymer MI | Polymer HLMI |
|---|---|---|---|---|---|---|---|
| $Al_2O_3$ | 1110/6 hours | 1.0 | 0.6 | 3/1 | 70 | — | 0.43 |
| $MgCO_3$ (3) | 1110/6 hours | 1.0 | 0.6 | 3/1 | 8 | — | NA |
| $SiO_2$(MS 952) | 1110/2 hours | 1.0 | 0.6 | 2.8/1 | 367 | 0.12 | 16.9 |

(1) Al as triisobutyl aluminum
(2) Polymerization Conditions:

| | |
|---|---|
| Solvent | Isobutane |
| Polymerization temperature °F. | 190°–200° F. |
| Ethylene | 10 mole % |
| $H_2$ Pressure | 10–50 psig |
| Total Pressure | 370–435 psig |

(3) Hydromagnesite from Newall's Ltd., England.

Still further work showing the broad scope of the air/heat treated supported catalyst is shown in Table V where a variety of reducing agents are used in conjunction with the air/heat treated supported catalysts. These reducing agents may be brought into contact with the air/heat treated catalyst in a variety of ways, e.g., by having the triethyl boron agent in the solvent stream to the reactor or by precontacting said catalyst with said agent prior to introducing it to the reactor or yet also by introducing the said agent with some dilution directly to the reactor independent of the solvent stream.

Use of Various Reducing Agents with the Triethyl Phosphoryl Chromium Catalyst

| Reducing Agent | Polymer X/Cr (7) | MI | HLMI | Productivity (gm Polymer/gm Catalyst/Hour) |
|---|---|---|---|---|
| triisobutyl aluminum (1) | 2.7 (2) | 0.20 | 26.5 | 400 |
| triethyl aluminum (1) | 2.7 (2) | 0.18 | 27.6 | 400 |
| diethyl aluminum ethoxide (1) | 5.0 (2) | 0.96 | 77.5 | 150 |
| triethyl boron (1) | 4.0 (3) | 0.11 | 19.9 | 280 |
| triethyl aluminum + triethyl amine (m/m) (1) | 2.8 (2) | 0.32 | 70.2 | 55 |
| triethyl boron + triisobutyl aluminum (10/1 m) (1) | 3.7 (4) | — | 7.0 | 320 |
| triethyl aluminum + | | | | |

-continued

| Use of Various Reducing Agents with the Triethyl Phosphoryl Chromium Catalyst | | | | |
|---|---|---|---|---|
| | Polymer | | | Productivity (gm Polymer/gm |
| Reducing Agent | X/Cr (7) | MI | HLMI | Catalyst/Hour) |
| dibutyl magnesium (1/6 m) (6) | 3.5 (4) | — | 12.5 | 2500 |
| diethyl zinc (6) | 2.0 (5) | 0.21 | 26.6 | 610 |

(1) MS 952 support triethyl phosphoryl chromium (1% Cr) air/heat treated 1110° F./6 hours
(2) Al/Cr
(3) B/Cr
(4) $\frac{B + Al}{Cr}$ or $\frac{Al + Mg}{Cr}$
(5) Zn/Cr
(6) Catalyst on high pore volume (2.5 cc/gm) siligel and air/heat treated at 1650° F./h hours
(7) X/Cr is atomic ratio of metal or non-metal to Cr
Polymerization Conditions
Solvent - Isobutane
10 mole % Ethylene
1.65 g $H_2$/Kg solvent, 435 psig total pressure
200° F. Polymerization Temperature As the most preferred embodiment of the invention it has been found that particularly favorable results are obtained when the organophosphoryl chromium compound is deposited on a silica gel support material, especially a silica gel with a high pore volume (>1.96 cc/g), and the catalyst is subsequently heated in dry oxygen containing gas, e.g., air, above about 400° F. and preferably over 650° F. for a period of time adequate to promote the productivity of the catalyst. Further, when such catalysts are used with reducing agents, especially triethyl boron (TEB), a particularly desirable blend of properties is obtained in the polymer.

The effect of TEB on silica gel supported organophosphoryl chromium catalysts is set forth in the data in Table VI.

TABLE VI

| | Effect of Triethyl Boron | | | |
|---|---|---|---|---|
| B/Cr (2) | Productivity (g Polymer/g Total Catalyst/Hour) | MI | HLMI | HLMI/MI |
| Triethyl phosphoryl chromium(1) | | | | |
| No TEB | 1030 | 0.1 | 11.0 | 110 |
| 2.7 | 1210 | 0.08 | 11.5 | 144 |
| Diethyl phosphoryl chromium(3) | | | | |
| 2.7 | 418 | low(4) | 0.5(4) | — |
| 5.4 | 400 | low(4) | 5.5(4) | — |
| Polymerization Conditions | | (A) | (B) | |
| Reactor Temperature | | 210° F. | 200° F. | |
| $H_2$ Pressure | | 10 psig. | None | |
| Total Pressure | | 435 psig. | 370 psig. | |
| Solvent | | Isobutane | Isobutane | |

TABLE VI-continued

| Effect of Triethyl Boron | | |
|---|---|---|
| Ethylene | 145 psig. | 145 psig. |

(1) Catalyst on MS 952 gel (1% wt. Cr + 0.6% wt. P) and air/heat treated at 1470° F. for 6 hours. Polymerization condition (A)
(2) B/Cr atomic ratio. Boron as triethyl boron.
(3) Catalyst on Polypor silica gel, air/heat treated at 1650° F./6 hours. Polymerization conditions (B).
(4) Powder samples.

The effect of using high pore volume silica xerogel as the support material is illustrated in Table VII. Silica xerogel having a pore volume greater than about 1.96 cc/g is preferred and is available under the trademark POLYPOR. As noted earlier, the preparation of such silica gels is described in U.S. Pat. Nos. 3,652,214; 3,652,215 and 3,652,216.

In addition to pore volume greater than about 1.96 cc/g, the POLYPOR support material is characterized by the major portion of said pore volume being provided by pores having pore diameters within the range of from about 300–600 Å, and by a surface area within the range of from about 200–500 m²/g. The pore volume is determined by the well known nitrogen adsorption-desorption technique described, for example, Catalysis, Vol. II, pages 111–116, Emmett, P.H., Reinhold Publishing Corp., New York, N.Y., 1955 (Run to a P/Po of 0.967 which is equivalent to 600 Å pore diameter), and elsewhere.

When using the POLYPOR supported catalysts, heat treatment in dry air for the promotion of polymerization activity may be carried out at temperatures of from about 1000° F. to about 2000° F. for at least about 2 hours, and preferably at temperatures in the range of from about 1500° F. to about 1650° F. for from about 6 to 12 hours.

The temperature of the heat treatment may generally vary up to the maximum temperature at which promotion of polymerization activity is achieved without impairing the structure of the support.

TABLE VII

| Triethyl Phosphoryl Chromium Catalyst On Silica Gels of Various Pore Volume | | | | | | |
|---|---|---|---|---|---|---|
| | P.V. | Reducing | Productivity (gms Polymer/ | Polymer Properties | | |
| Silica Gel | (cc/gm) | Agent | gm Catalyst/Hour) | MI | HLMI | Density |
| MS 952 (1) | 1.5 | None | 1030 | 0.1 | 11.0 | .9558 |
| POLYPOR (1) | 2.3 | None | 1245 | 0.26 | 23.6 | .9586 |
| POLYPOR (1) | 2.3 | 2.7/1 (2) | 1798 | 0.23 | 18.6 | .9515 |
| POLYPOR (1) | 2.3 | 5.4/1 (2) | 1360 | 0.12 | 18.2 | (not available) |

TABLE VII-continued

Triethyl Phosphoryl Chromium Catalyst
On Silica Gels of Various Pore Volume

| Polymerization Conditions | |
|---|---|
| Reactor Temperature | 210° F. |
| H$_2$ Pressure | 10 psig. |
| Total Pressure | 435 psig. |
| Solvent | Isobutane |
| Ethylene | 145 psig. |

(1) Catalyst on gel at 1% Cr and 0.6% P. MS 952 air/heat treated 1470° F./6 hours POLYPOR silica gel air/heat treated 1650° F./6 hours.
(2) B/Cr atomic ratio. Boron as triethyl boron.

The effect of TEB as a reducing agent using the high pore volume silica gel as catalyst support is also observed in Table VII. Here it is found that with only a slight change in the MI of the polymer an appreciable change occurs in the density when TEB is used as a reducing agent, i.e., the density of the polymer produced with this catalyst on the high pore volume silica gel may be controlled by using TEB as reducing agent. In addition, the effect of the use of triethyl boron on the molecular weight distribution of the produced polymer is seen from Table VII. The molecular weight distribution (as measured by the HLMI/MI ratio) is increased from 91 when using the triethyl phosphoryl chromium catalyst on POLYPOR to 151 when triethyl boron is included at 5.4/1 B/Cr ratio. This broadening of the molecular weight distribution contributes significantly to improved polymer shear response.

A further illustration of the versatility of this catalyst placed on high surface area silica gel (POLYPOR) is its response to hydrogen which results in an increase in the MI of the polymer produced with increased hydrogen pressure during the polymerization. This effect is illustrated in Table VIII.

TABLE VIII

Hydrogen Effect on Organophosphoryl Chromium Catalyst on POLYPOR (1)

| H$_2$ Pressure psig | Productivity (gms Polymer/gm Catalyst/Hour) | B/Cr (2) | MI | HLMI |
|---|---|---|---|---|
| Triethyl Phosphoryl Chromium | | | | |
| 10 | 1363 | 5.4 | 0.12 | 18.2 |
| 20 | 992 | 5.4 | 0.21 | 20.4 |
| 50 | 1052 | 5.4 | 0.43 | 33.2 |
| Diethyl Phosphoryl Chromium | | | | |
| 0 | 400 | 5.4 | low | 5.5 |
| 30 | 510 | 5.4 | low | 15.0 |
| 75 | 505 | 5.4 | 0.15 | 21.2 |

| Polymerization Conditions | (A) | (B) |
|---|---|---|
| Reactor Temperature | 210° F. | 200° F. |
| Solvent | Isobutane | Isobutane |
| Ethylene | 137 to 145 psig | 137 to 145 psig |
| Total Pressure | 435 to 465 psig | 435 to 465 psig |

(1) Catalyst on POLYPOR silica gel at 1.0% Cr and 0.6% P and then air/heat treated 1650° F./6 hours. Polymerization condition (A).
(2) B/Cr atomic ratio. Boron as tirethyl boron.

Compared with polymers produced with prior art catalyst systems, the polymers produced using the catalyst of this invention exhibit a better balance of end use properties including stiffness, stress crack resistance, and processability needed for blow molding resin.

For example, the following Table IX presents a comparison of properties for three resins produced under optimum commercial reactor conditions. Specifically, Resin A, the resin produced in accordance with this invention using triethyl boron as part of the catalyst system is compared with polyethylene resins produced using conventional CrO$_3$ on SiO$_2$ catalysts.

TABLE IX

Comparison of Polymer End Use Properties

| Resin Type | A | B | C |
|---|---|---|---|
| Melt Index | 0.40 | 0.28 | 0.21 |
| Density | 0.954 | 0.953 | 0.953 |
| Viscosity (1) | 3.67 | 3.92 | 3.75 |
| Stress Crack Resistance (2) | 230 | 36 | 84 |
| Flexural Stiffness, psi | 115,000 | 110,000 | 111,000 |

(1) Poises × 10$^{-3}$ at 1000 sec$^{-1}$ shear rate.
(2) Hours to 50% failure, ASTM D-1693 Condition B (Modified)

Resin A was produced in a continuous slurry reaction system using catalyst prepared by supporting the triethyl phosphoryl chromium compound on POLYPOR silica gel, and treated with dry air at 1650° F. for 6 hours and used in combination with triethyl boron at a B/Cr atomic ratio of 2.4/1. Resin density was controlled by TEB addition only.

Resin B was produced in a continuous slurry reaction system using a state-of-the-art CrO$_3$ on SiO$_2$ catalyst prepared and run under optimum conditions. Density of the resin was controlled by the separate addition to the reactor of hexene-1 for copolymerization with ethylene.

Resin C is a melt blend of two resins both produced in a continuous slurry reaction system. For both component resins, state-of-the-art CrO$_3$ on SiO$_2$ type catalysts were utilized under conditions which resulted in optimum blend properties. Basically, Resin C is a blend of two different molecular weight resins which give a broader MWD product than Resin B. Density of the product is controlled by the separate addition of butene-1 for copolymerization of butene-1 in the high molecular weight component.

Inspection of Table IX clearly shows that Resin A has a better balance of properties than does the single reactor product, Resin B, or even the more expensive and difficult to prepare product, Resin C. That is, with at least equivalent processability (as noted by viscosity) the resin of this invention has superior stiffness and stress crack resistance. Thus, utilizing the polymers prepared in accordance with the precepts of this application permits blow molded articles of special value to be prepared efficaciously. While not wishing to be bound by any proposed mechanism, it is believed that the desirable properties of these structures may be attributed at least in part to the rheological behavior of the polymers produced in accordance with this invention under flow and deformation involved in the fabrication of end use articles, and the contribution of molecular weight balance to product characteristics. Control of polymer properties is achieved in this invention by selective utilization of catalyst systems as disclosed.

Optimally, polymer of significant shear sensitivity represented by HLMI/MI ratios of 40 or 50 or more is prepared, at molecular weight i.e. melt indices ranging from below the measurable to about 1 or 2. HLMI values will preferably range from about 5 to about 75.

What is claimed is:

1. A process for the polymerization of 1-olefins to produce polymers, copolymers and interpolymers of said 1-olefins comprising contacting said 1-olefins, under polymerization conditions of temperature and pressure, with a catalyst composition comprising a solid inorganic support material having deposited thereon an organophosphoryl chromium product obtained from the reaction of chromium trioxide and an organophosphorus compound having the formula

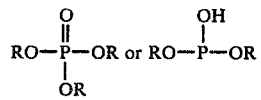

wherein R is alkyl, aralkyl, aryl, cycloalkyl, or hydrogen, but at least one R group is other than hydrogen, said catalyst composition having been heated in a dry oxygen containing atmosphere at a temperature about about 400° F. and below the temperature at which the structure of the support is impaired for a period of time sufficient to promote the polymerization activity of said catalyst composition for the polymerization of 1-olefins.

2. The process of claim 1 wherein said support material comprises silica gel.

3. The process of claim 1 wherein said support material comprises a high pore volume silica xerogel having a pore volume in excess of about 1.96 cc/g, wherein the major portion of said pore volume is provided by pores having pore diameters within the range of from about 300 to about 600 Å.

4. The process of claim 1 further comprising contacting said 1-olefins with said catalyst composition in the presence of an organic reducing agent.

5. The process of claim 4 wherein said organic reducing agent comprises an organometallic compound.

6. The process of claim 5 wherein said organometallic compound comprises a compound selected from the group consisting of alkyl aluminum, alkyl aluminum halide and alkyl aluminum alkoxide compounds.

7. The process of claim 6 wherein said reducing agent comprises triethyl aluminum.

8. The process of claim 6 wherein said reducing agent comprises triisobutyl aluminum.

9. The process of claim 6 wherein said compound is present in an amount sufficient to provide an aluminum to chromium atomic ratio in the range of from about 1:1 to about 5:1.

10. The process of claim 4 wherein said reducing agent comprises triethyl boron.

11. The process of claim 10 wherein said triethyl boron is present in an amount sufficient to provide a boron to chromium atomic ratio in the range of from about 0.1:1 to about 10:1.

12. The process of claim 11 wherein the polymerization is conducted in the presence of hydrogen.

13. The process of claim 12 wherein the hydrogen pressure is in the range from about 10 to about 75 psig.

* * * * *